(12) United States Patent
Vacanti

(10) Patent No.: US 6,686,872 B2
(45) Date of Patent: Feb. 3, 2004

(54) SYSTEM AND METHOD FOR IN-PLACE, AUTOMATED DETECTION OF RADOME CONDITION

(75) Inventor: David C. Vacanti, Renton, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/211,154

(22) Filed: Aug. 2, 2002

(65) Prior Publication Data

US 2003/0071753 A1 Apr. 17, 2003

Related U.S. Application Data

(60) Provisional application No. 60/311,392, filed on Aug. 10, 2001.

(51) Int. Cl.[7] .............................. G01S 7/40; H01Q 1/42; G01R 35/00
(52) U.S. Cl. ...................... 342/173; 342/165; 343/872; 324/601
(58) Field of Search .......................... 342/26, 165, 173, 342/360; 343/872; 324/601, 602, 637, 639, 642, 647

(56) References Cited

U.S. PATENT DOCUMENTS

| 3,936,736 A | | 2/1976 | Ray |
| 4,097,796 A | * | 6/1978 | Lunden ....................... 324/642 |
| 4,665,401 A | * | 5/1987 | Garrard et al. ................ 342/75 |
| 5,066,921 A | * | 11/1991 | Rope et al. .................. 324/639 |
| 5,371,505 A | | 12/1994 | Michaels |
| 5,485,159 A | * | 1/1996 | Zhang et al. ................ 342/165 |
| 6,469,659 B1 | * | 10/2002 | Lajiness et al. ............. 342/173 |

* cited by examiner

Primary Examiner—Thomas H. Tarcza
Assistant Examiner—Brian K Andrea
(74) Attorney, Agent, or Firm—Honeywell Int'l Inc.

(57) ABSTRACT

A system for performing automated in-place measurement of reflectivity of a radome of an airplane. Includes a radar drive circuit that generates radar signals at a predetermined frequency. An antenna receives the generated radar signals from the radar drive circuit, and transmits radar waves at the predetermined frequency. The antenna receives radar return waves from the radome. The antenna is mountable on a scanning apparatus that scans a substantial area of the radome. A signal processor processes the radar return waves from the radome that are received by the antenna. The signal processor determines whether magnitude of the radar return waves from the radome exceeds a predetermined level for a given position on the radome. When the magnitude of the radar return waves exceeds the predetermined level, a degraded condition of the radome is indicated and an alert signal is generated and provided to an operator.

63 Claims, 5 Drawing Sheets

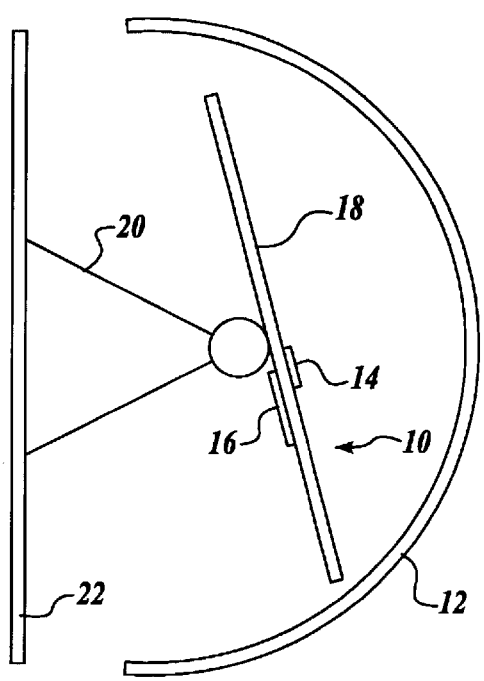
*Fig. 1.*
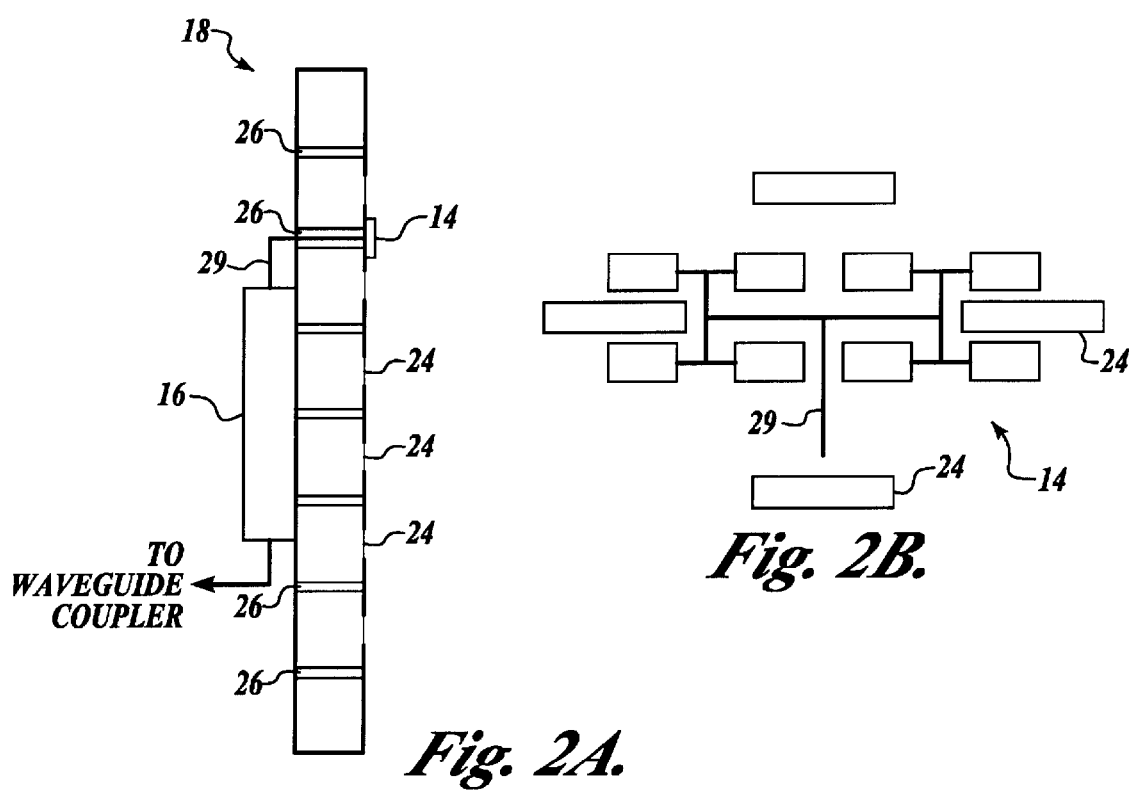
*Fig. 2A.*
*Fig. 2B.*

US 6,686,872 B2

SYSTEM AND METHOD FOR IN-PLACE, AUTOMATED DETECTION OF RADOME CONDITION

This application claims the benefit of prov. No. 60/311,392 filed Aug. 10, 2001.

BACKGROUND OF THE INVENTION

Weather radar systems used aboard commercial and private aircraft are dependant on transmissivity of the radome in front of the weather radar antenna to permit transmission and reception of weather radar signals. However, long exposure to impact by rain, hail, dust, and other objects can cause the protective outer surface of the radome to degrade or possibly delaminate. Specifically, the region at the front of the radome degrades faster then other portions of the outer surface of the radome due to driving rain. When the outer surface of the radome becomes degraded, water may then begin to penetrate the radome. The water is retained by the radome material and can degrade the transmissivity of the radome and, in turn, the sensitivity of the radar. In operation, it is not apparent to the radar operator that water penetration has occurred or that possible degradation of radar performance may have occurred.

As currently known in the art, radomes are routinely removed on the ground for inspection, replacement, or reinstallation. For example, testing of radomes using currently known methods entails removing the radome from the aircraft, placing the radome on a test set, and measuring transmissivity of the radome by measuring the loss from one antenna placed inside the radome and a second test antenna just opposite and outside the radome. Such maintenance work removes the aircraft from service, costing time and money that may be unnecessarily spent. Further, improper repairs made to a radome after substantial damage, such as that from a bird strike, can result in distortion of antenna beams and poor transmissivity. Such problems may not be detected until the next scheduled maintenance.

In addition, conditions that cause poor radome performance in operation, such as wetting of the outer surface due to rain, may not exist on the ground where the radome is tested. In such a case, the radome may be erroneously approved for return to service.

Thus, there is an unmet need in the art for a method of monitoring radome conditions while the radome is in operation, thereby increasing radar reliability and improving cost effectiveness of radar operation and maintenance.

SUMMARY OF THE INVENTION

A system and method for automated in-place detection of radome condition is provided. The present invention measures variable reflectivity of a radome directly in front of a typical weather radar antenna by using a radar that operates at a frequency that includes multiple half-wave lengths of the weather radar. As is known, a normal radome with good transmissivity will provide a very low reflection to incident energy at the operating frequency of the weather radar and at a few multiples of the operating frequency of the weather radar. However, presence of water within the radome walls, or a change in dielectric constant of the radome due to poor repairs, will significantly increase absorption and reflection of any incident radio frequency energy. Thus, the invention includes a low power radar operating at a harmonic of the operating frequency of the weather radar. The radar of the invention continuously monitors reflection coefficients of a radome and compares the reflection coefficients to a stored table of data. A reflection coefficient that exceeds the corresponding stored reflection coefficient for that location of the radome by a predetermined factor indicates a possible radome failure.

According to the invention, a system and method for performing automated in-place measurement of reflectivity of a radome of an airplane is provided. The system includes a radar drive circuit that is arranged to generate radar signals at a predetermined frequency. An antenna is arranged to receive the generated radar signals from the radar drive circuit, and is arranged to transmit radar waves at the predetermined frequency. The antenna is arranged to receive radar return waves from the radome. The antenna is mountable on a scanning apparatus that is arranged to scan a substantial area of the radome. A signal processor is arranged to process the radar return waves from the radome that are received by the antenna. The signal processor is arranged to determine whether magnitude of the radar return waves from the radome exceeds a predetermined level for a given position on the radome. When the magnitude of the radar return waves exceeds the predetermined level, an alert signal is generated and provided to an operator.

BRIEF DESCRIPTION OF THE DRAWINGS

The preferred and alternative embodiments of the present invention are described in detail below with reference to the following drawings.

FIG. 1 is a side view of the invention installed on a host radar system;

FIG. 2A is a side view of the invention installed on a host radar antenna;

FIG. 2B is a detailed front view of an antenna of the invention;

DETAILED DESCRIPTION OF THE PREFERRED EMBODIMENT

Figure 3A:
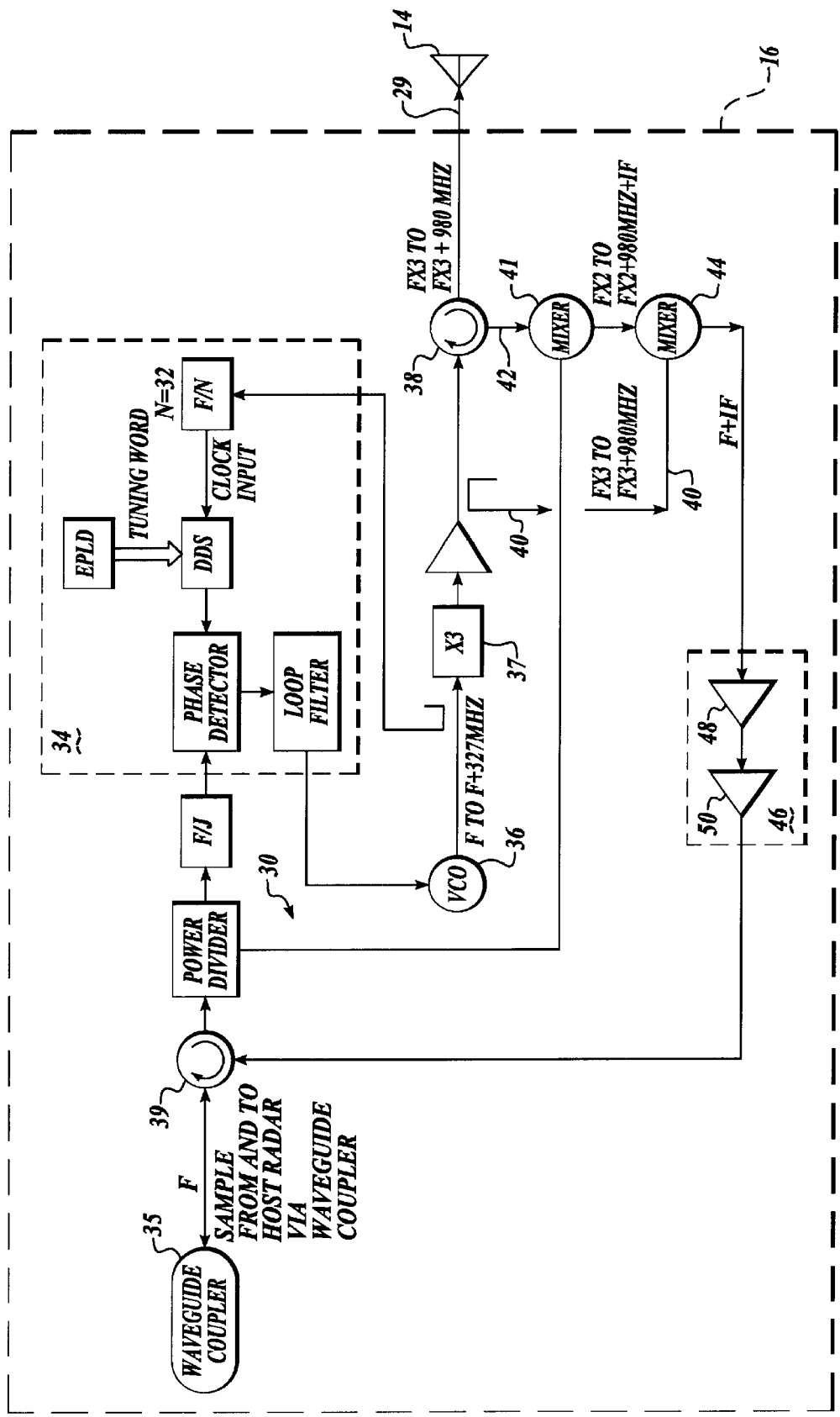
FIG. 3A is a block diagram of the invention mounted on the host radar antenna.

The present invention provides a system and method for automated in-place detection of radome condition. The invention measures variable reflectivity of a radome directly in front of a typical weather radar antenna by using a radar that operates at a frequency that involves multiple half-wave lengths of the radar antenna.

Referring to FIG. 1, a system 10 for performing automated in-place detection of condition of a radome 12 includes an antenna 14 and radar circuitry 16. The antenna 14 and the radar circuitry 16 are mounted on a host antenna 18, such as an antenna for a weather radar system. As is known, the host antenna 18 is mounted on an antenna gimbal 20 that is in turn mounted to an aircraft bulkhead 22. As is known, the antenna gimbal 20 causes the host antenna 18 to scan throughout azimuth and elevation angles. Thus, when the host antenna 18 is scanned throughout azimuth and elevation angles by the antenna gimbal 20, the antenna 14 of the system 10 in turn scans the radome 12.

The system 10 is suitably a frequency modulation/continuous wave (FM/CW) radar system. Range resolution of the system 10 is suitably commensurate with a minimum range from the antenna 14 to the radome 12. Typical distances between the antenna 14 and the radome 12 are generally three feet or less. Further, the antenna 14 is preferably sized to be small enough such that the antenna 14 operates in its far field at the distance from the antenna 14 to the radome 12. To achieve both the far field criteria and the range resolution criteria, the system 10 is preferably realized as an FM/CW radar operating in the millimeter wave frequency range of about 30 GHz.

Referring now to FIGS. 1 and 2A, the host antenna 18 is suitably an antenna for a weather radar system. Weather radar systems are well known in the art, and a detailed explanation of the host antenna 18 is not necessary for an understanding of the invention. For example, a suitable host antenna 18, given by way non-limiting example, is a 9.3 GHz waveguide antenna, such as that used in the RDR-4B radar system, available from Honeywell International, Inc. Such an exemplary host antenna 18 includes rows of slotted elements 24. As is also known, the host antenna 18 includes a plurality of waveguide walls 26. It will be appreciated that the far field of an exemplary weather radar system that includes the host antenna 18 operates in its far field at a distance of approximately 100 feet. As a result, it will be appreciated that operation of the system 10 will not interfere with proper operation of a weather radar system that employs the host antenna 18.

Referring now to FIGS. 1, 2A, and 2B, the antenna 14 is preferably a patch antenna, such as a printed circuit microstrip antenna, that is mounted on a front surface of the host antenna 18. In a preferred embodiment, the antenna 14 is sized to fit between rows of the slotted elements 24 of the host antenna 18. In a currently preferred embodiment, a suitable sizing for the antenna 14 is a 1 inch×0.5 inch printed circuit microstrip patch antenna. As discussed above, mounting the antenna 14 on the host antenna 18 allows the scanning apparatus, such as the antenna gimbal 20, for the host antenna 18 to be used to cause the antenna 14 to scan the radome, thus avoiding a need for additional scanning apparatus. However, by sizing the antenna 14 small enough and by mounting the antenna 14 between rows of the slotted elements 24, the antenna 14 operates with little or no interference with the host antenna 18 or the weather radar system. It will be appreciated that the antenna 14 may be sized as desired, however, for mounting on the host antenna 18 without interfering with the host antenna 18.

The radar circuitry 16 is preferably mounted on a backside of the host antenna 18. This provides for the lowest possible losses to and from radar circuitry 16 and antenna 14, as well as ease of operation and installation of the radar circuitry 16. By mounting the radar circuitry 16 on the back of the host antenna 18, a waveguide 28 from the radar circuitry 16 to the antenna 14 can be fed through the wall 26 of the host antenna 18. Given by way of non-limiting example, the waveguide 28 suitably includes a coaxial cable for feeding the antenna 14. The waveguide 28 suitably includes a small diameter coaxial cable 29, such as a 0.023-inch diameter coaxial cable for feeding the antenna 14. However, it will be appreciated that the waveguide 28 can include any acceptable cable of any suitable diameter as desired for a particular application. This embodiment is desired to avoid interfering with the operation of the host antenna 18. It will be further appreciated that the antenna 14 and the radar circuitry 16 may be mounted on any acceptable scanning apparatus. For example, the antenna 14 and the radar circuitry 16 may be mounted on a gimbal that is dedicated to the antenna 14 and the radar circuitry 16. Alternatively, the antenna 14 (and not the radar circuitry 16) may be mounted on its own scanning apparatus, such as a gimbal. In this case, the radar circuitry 16 may be located as desired and connected to the antenna 14 with an acceptable coax.

Figure 3B:
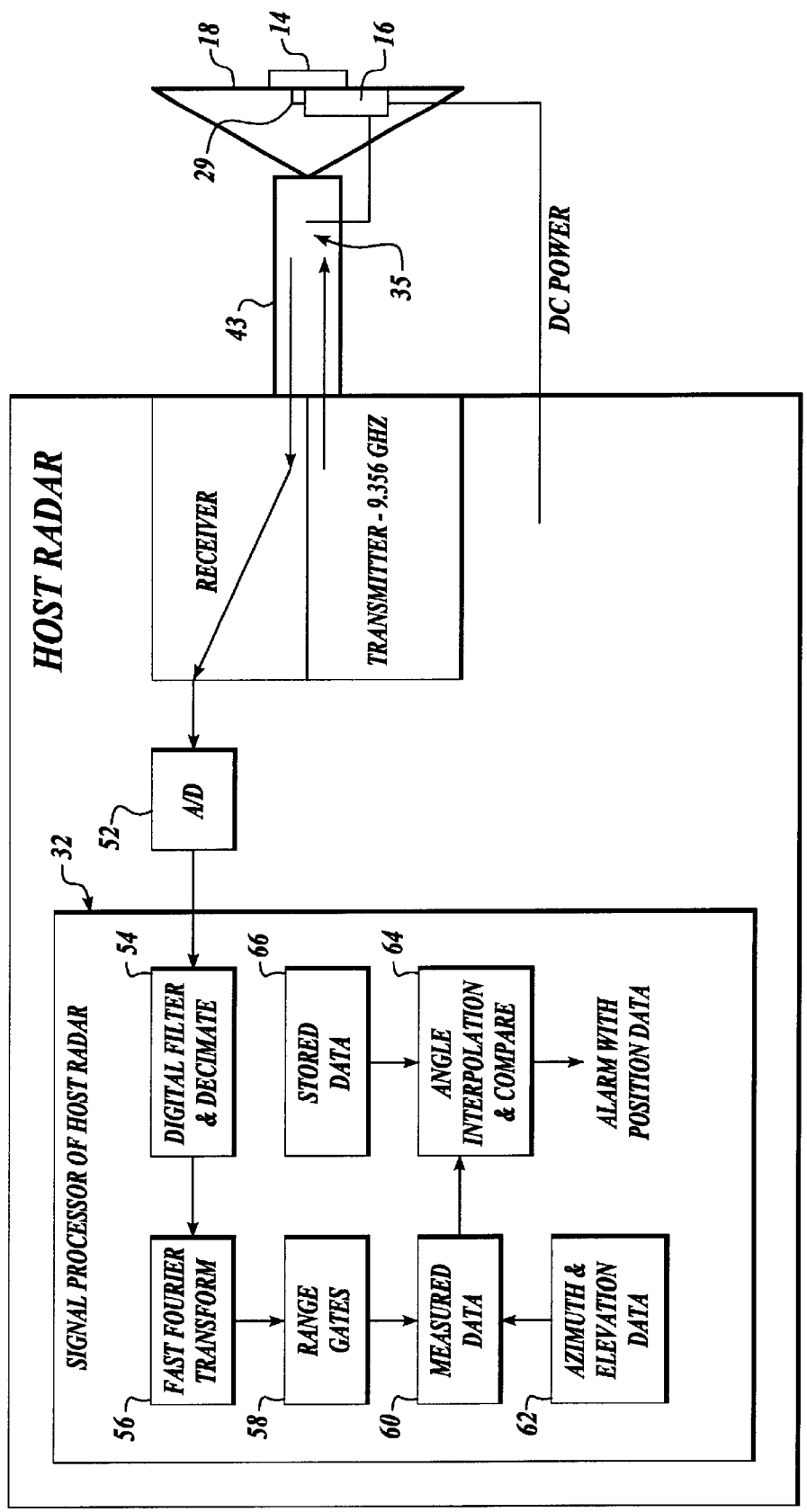
FIG. 3B is a block diagram of the overall invention integrated with the host radar.

FIGS. 3A and 3B show block diagrams of the radar circuitry 16. The radar circuitry 16 includes a radar drive circuit 30. The radar drive circuit 30 is preferably an FM/CW radar that operates in the millimeter wave frequency range of about 30 GHz. The operating frequency of the radar drive circuit 30 is predetermined to be a low harmonic of the operating frequency of the weather radar. This is because internal reflection from the radome 12 occurs for radar waves having wavelengths of $N\lambda/2$, where $\lambda$ is the operating wavelength of the weather radar and N is an integer greater than or equal to 1. As is known, internal reflection increases as higher order harmonics of the base frequency are used and therefore a low harmonic is desired. For portions of the radome 12 that are not in a degraded condition, it is desirable that most of the radiated energy go through the radome 12 and that radar returns be negligible compared to the amount of energy transmitted through the radome 12. For example, in one embodiment of the invention, magnitude of radar waves reflected from a good portion of the radome 12 may be on the order of 20 dB down from the magnitude of transmitted radar waves. On the other hand, for portions of the radome 12 that are in a degraded condition, it is desirable that most of the radiated energy be reflected from the degraded portion of the radome 12. In addition, other factors contribute to a determination of the desired frequency at which the radar circuitry 16 operates. For example, it is well known that 70 GHz signals are highly absorbed in moisture. In order to balance factors to optimize an operating frequency of the radar circuitry 16, in one currently preferred embodiment, the radar circuitry 16 operates at a frequency that is a third harmonic of the operating frequency of the host weather radar system. For example, when the host weather radar system operates at a frequency of 9.3 GHz, the radar circuitry 16 operates at the third harmonic frequency of around 27.9 GHz. It will be appreciated that other harmonics and frequencies may be used as desired for various applications.

Figure 4A:
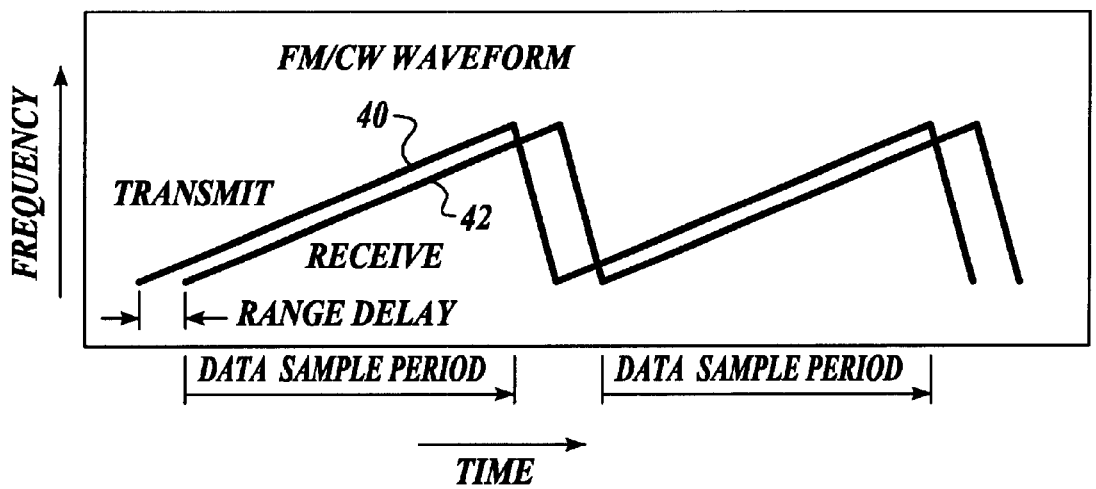
FIG. 4A is an illustration of a radar waveform of the invention.

The radar drive circuit 30 includes a voltage ramp circuit 34. The voltage ramp circuit 34 generates, in a known manner, a voltage saw tooth waveform that is input to an oscillator 36. Using known techniques, the oscillator 36 outputs a FM/CW waveform. The waveform from the oscillator 36 is input to a circulator 38. The circulator 38 transmits the waveform 40 to the antenna 14 (FIG. 4A). In one embodiment, the waveform 40 is an FM/CW waveform having a chirp bandwidth of 980 MHz and a chirp period of one millisecond. However, other chirp bandwidths and chirp periods may be used as desired for a particular application. It will be appreciated that the transmitted power of the waveform 40 is suitably a low power due to the short range between the antenna 14 and the radome 12. As a result, the transmitted power from circulator 38 is suitably on the order of one milliwatt. However, it will be appreciated that any power level may be used as desired for an application. It will be appreciated that the far field of the system 10, including the antenna 14 and transmitting the waveform 40, is within the radome 12. Further, it will be appreciated that range resolution for the system 10 is suitably on the order of six inches or less. As a result, it will be appreciated that the dynamic range of the system 10 is therefore on the order of about 30–40 dB. With a minimum range resolution of six inches, an octave, or doubling, of range is therefore 12 inches or one foot. Typically, range between the antenna 14 and the radome 12 is on the order of about three feet. Therefore, three feet represents three octaves of range. At 12 dB per octave, three octaves of range represent about 36 dB of dynamic range for the system 10. Because FM/CW systems are well known in the art, a detailed description of the construction and operation of the voltage ramp circuit 34, the oscillator 36, or the circulator 38 is not necessary for an understanding of the invention. For example, a closed phase-lock-loop circuit of the type shown in 34 may generate the voltage ramp. The oscillator 36 may be a coaxial resonator oscillator consisting of a Field Effect Transistor, a ceramic coaxial resonator, and a varactor diode to adjust the frequency of the oscillator. The oscillator 36 operates at approximately the same frequency as the host radar derived from waveguide coupler 35 (FIG. 3B). Its frequency is in turn multiplied to the desired low harmonic of the host radar by the frequency multiplier circuit 37. In this embodiment the multiplier 37 uses a factor of 3 to arrive at approximately 27.9 GHz. A frequency multiplier circuit is commonly known to those skilled in the art and may be made using a step recovery diode and an output circuit tuned for the desired $3^{rd}$ harmonic.

The transmitted waveform 40 and the beam shape of the antenna 14 exhibit suitable characteristics to provide radar returns from radomes having widely varied geometries. Advantageously, sensitivity of the system 10 is typically greatest at the forward point of the radome 12. This is because the forward point of the radome 12 typically presents a nearly normal angle of incidence to a beam transmitted by the antenna 14. It will be appreciated that degradation of the radome 12 may be more likely at the forward point of the radome 12, thus heightening this advantage of the invention.

However, it will be appreciated that the radome 12 may not present many normal angles of incidence to a radar wave transmitted from the antenna 14. Thus, it will be appreciated that a wider beamwidth is more desirable than a narrow beamwidth for antenna 14. Further, narrow beamwidths increase the likelihood of forward scatter or returns from lightning strips that may be present on the exterior of the radome. Finally, narrow beamwidths increase the likelihood that the far field of the system 10 may exceed six inches. It is desirable that beam characteristics of the waveform 40 accommodate radomes of varied geometry while maintaining a far field of about six inches to reduce likelihood of forward scatter. In one embodiment of the invention, such beam characteristics include a horizontal beamwidth of about 17 degrees and a vertical beamwidth of about 34 degrees. It will be appreciated, however, that other horizontal and vertical beam widths may be chosen for a particular application.

It will be appreciated that in order to determine the condition of the radome and convey an alert to the pilot, it is desirable to have access to the azimuth and elevation position of the host antenna 18, communicate with host radar display, and process the information provided by the radar circuitry 16. The host-radar signal processor has direct pre-wired access to the radar display, azimuth and elevation position of the host antenna 18 and has the capacity to process the received waveform 42 to determine the condition of the radome 12. In order to make the installation of this invention possible as a retrofit and to require the minimum possible number of wire connections across the gimbal, it is therefore preferable to make use of the host radar receiver and the host-radar signal processor 32 (FIG. 3B). In this embodiment, the host radar permits the operation of the radar circuitry to occur between periods when it normally processes weather radar returns or when the weather radar function is in test or other non-functional mode.

In order to use the host-radar receiver and signal processor 32 (FIG. 3B) the output of the radar circuitry 16 travels down the same waveguide 43 (FIG. 3B) used by the host radar to transmit and receive from the host antenna 18. A frequency near the frequency used by the host radar will propagate in waveguide 43 and remain within the bandwidth of the host radar receiver. Therefore, the frequency output of the radar circuitry 16 is suitably nearly the same as that of the host radar. The output of the radar circuitry 16 is maintained near the host radar frequency as follows.

The circulator 38 directs waveform 42 (FIG. 4A) from the radome 12 to a mixer 41. The mixer 41 is any suitable mixer known in the art that is arranged to mix signals of about 30 GHz. The mixer 41 beats the received waveform 42 with a fixed frequency derived from the host radar via the waveguide coupler 35 (FIG. 3B). The output of mixer 41 translates the received waveform 42 down to a frequency of 2 times the radar host frequency. In this embodiment the frequency is about 18.6 GHz. The translated waveform 42 is then applied to mixer 44. The mixer 44 is suitably any mixer known in the art that is arranged to mix signals having frequencies of about 18 to 30 GHz. The mixer 44 beats the received waveform 42 against the transmitted waveform 40. It will be appreciated that mixing the translated received waveform 42 at about 18.6 GHz with the transmitted waveform 40 at 27.9 GHz results in a frequency that is nearly the same as the host radar (9.3 GHz). It will be appreciated that it is now possible for the resulting frequency to travel to the host radar receiver and signal processor via circulator 39 and waveguide coupler 35. It will also be appreciated that the magnitude of the signal that is output from the mixer 44 is indicative of the magnitude of the received waveform 42. It will also be appreciated that the frequency of the resultant signal that is output from the mixer 44 is the difference in frequency between the frequency of the transmitted waveform 40 and the translated received waveform 42. It will further be appreciated that the frequency of the signal that is output from the mixer 44 is equal to the host radar frequency offset by a frequency proportional to range from the antenna 14 to the radome 12, as shown below:

$$\Delta f = \frac{\text{chirp bandwidth}}{\text{chirp period}} \times \frac{2 \text{ times range from antenna to radome}}{3 \times 10^8} + \text{Host Radar Frequency}$$

where:
 Δf is difference in frequency between transmitted waveform and received waveform;
 Chirp bandwidth is in megahertz;
 Chirp period is in milliseconds; and
 Range is in meters.

It will be appreciated that with a chirp bandwidth of 980 MHz, a chirp period of one millisecond and a six-inch range, Δf is about 1 KHz. Similarly, when range is about three feet, Δf is about 6 KHz. Thus, it will be appreciated that for expected ranges associated with a typical radome, the difference in frequency between the transmitted waveform 40 and the received waveform 42, that is Δf, is within the audio frequency spectrum. Thus, according to the invention, further processing of the output from the mixer 44 may be easily performed by the host radar signal processor.

To pre-condition the output signal from the mixer 44 for processing by the host radar receiver and signal processor, the output from the mixer 44 is amplified by an amplifier 46. The amplifier 46 is suitably any low noise amplifier known in the art for amplifying signals in the host radar frequency spectrum. Shown by way of non-limiting example, the amplifier 46 may include two stages, such as a preamplifier 48 and a driver amplifier 50.

The output from the amplifier 46 is input to the receiver of the host radar. The host radar receiver converts the signal from amplifier 46 to the audio spectrum where it is input to an analog-to-digital (A/D) converter 52. The A/D converter 52 is suitably any acceptable A/D converter that is known in the art, is acceptable for use by the host radar, and operates at a sample frequency that is at least twice that of the audio spectrum produced by the invention. Thus, a sample frequency of two times a typical maximum $\Delta f$, such as $\Delta f = 6$ KHz when range is 3 feet as described above, is still within the audio frequency range. Because low noise amplifiers 46 and A/D converters 52 are well known in the art, a detailed explanation of their construction and operation is not necessary for an understanding of the invention.

The digitized output from the A/D converter 52 is input to the host-radar signal processor 32. The host radar signal processor is capable of far processing bandwidth far in excess of the audio spectrum produced by the invention and will easily process the received waveform. Because high-speed digital signal processors are well known in the art an explanation of its construction and operation is not necessary for an understanding of the invention. However, functionality of the signal processor 32 is shown in block diagram form in FIG. 3B. The functionality shown in FIG. 3B will be discussed below for the signal processor 32.

At a block 54, a digital filter is applied to the output signal from the A/D converter 52. Because the A/D converter 52 operates at a far higher data acquisition rate than the audio spectrum produced by the invention, only a fraction of the samples produced by the A/D converter 52 are required. A narrow band digital filter 54 is implemented by reducing the number of A/D samples via the process known as decimation. This limits the frequencies passed to the Fast Fourier Transform 56 to only those produced by the invention. At a block 56, a Fast Fourier Transform (FFT) is applied to the filtered signal to transform the signal from the time domain to the frequency domain. The FFT is suitably a sixteen point FFT. However, a Fast Fourier Transform having more or less points may be used as desired. The 16 FFT points are comprised of 8 pairs of real (I) and imaginary (Q) quadrature components. Each of I and Q pairs may be combined to compute the amplitude of each range gate by taking the square root of the sum of I squared and Q squared. The resulting 8 amplitudes are collected as range gates in block 58. Each 6-inch range gate of block 58 holds the amplitude of the reflection from the radome at any distance from antenna 14 to the radome 12 for ranges from 6 inches to 4 feet. This collection of range gates corresponds to all anticipated ranges that can occur between antenna 14 and radome 12. The amplitude of the reflection saved in each range gate corresponds directly to the reflectivity or transmissivity of the radome at that range from the antenna 14. By comparing these amplitudes with amplitudes collected when the radome was new or known to be in good condition makes it possible for the invention to determine if the radome has deteriorated since installation or since it was last tested by this invention.

While the embodiment described above uses the host radar to process the data from the antenna 14, it will be appreciated that the invention is not so limited. For example, a separate independent processing apparatus can be used to perform the same functions as the host radar.

Figure 4B:
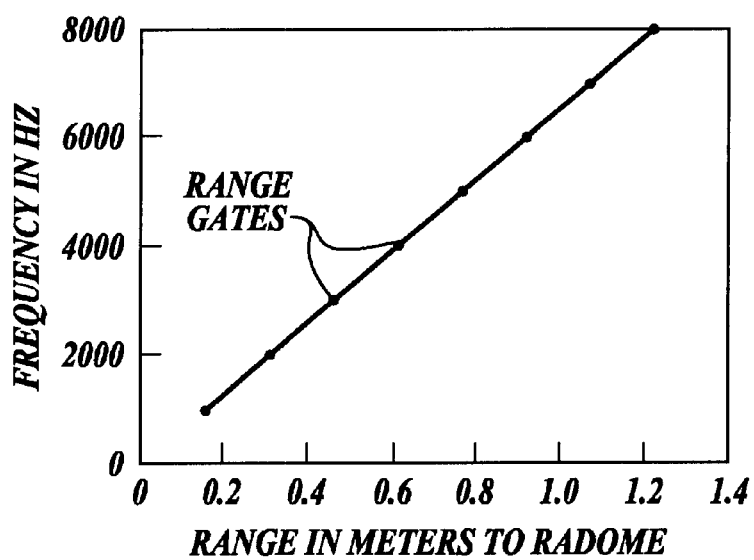
FIG. 4B is a graph of range versus frequency according to the invention.

As discussed above, a 1 KHz difference in frequency between the transmitted wave form 40 and the received wave form 42 corresponds to approximately six inches of range between the antenna 14 and the radome 12. Advantageously, when a sixteen point FFT is applied at the block 56, eight range gates each representing six inches of range between the antenna 14 and the radome 12 are produced. That is, each range gate represents approximately six inches of range is a frequency bin of 1 KHz, as shown in FIG. 4B. It will be appreciated that returns that are spaced less than six inches apart will fill two adjacent frequency bins or range gates. However, this situation is not problematic; it is sufficient that the system 10 has a minimum range resolution of six inches for typical radome applications.

Figure 5A:
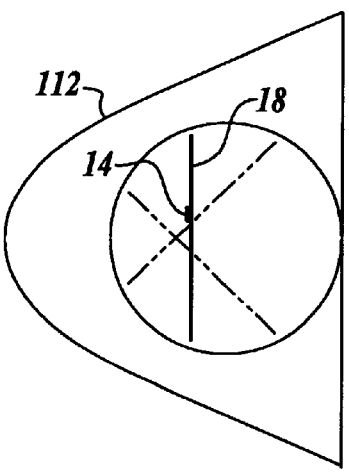
FIGS. 5A–5C are overhead schematic views of various radomes monitored by the invention.
Figure 5B:
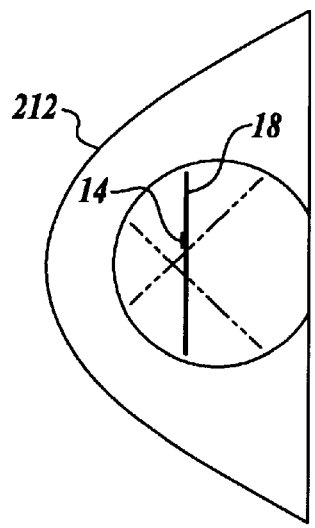
Figure 5C:
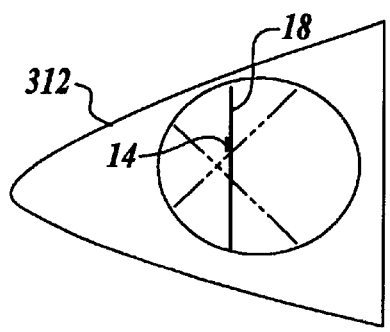

Referring now to FIGS. 3A and 5A–C, it will be appreciated that radomes have widely varied shapes. As shown in FIGS. 5A–5C, range varies from the antenna 14 to the radome 112, 212, and 312. The varied shapes of radomes thus present variable reflection coefficients as a function of azimuth and elevation scan angles. The FFT processing at the block 56 provides the needed range extent to process returns from radomes having widely varied shapes. However, another factor must be taken into account to process a return to determine if a radome condition is faulty.

Referring to FIGS. 1 and 5A–5C, it will be appreciated that locations of radar antennas, either the host antenna 18 or the antenna 14 of the system 10, are not always centered within the radomes 12, 112, 212, and 312. Simply monitoring magnitude of radar returns from the radome 12 may be sufficient for monitoring condition of a radome in which the antenna 14 is centered within the radome 12 and in which the radome 12 presents a uniformed shape, such as a spherical shape, to the centered antenna 14. However, an off-center location of the antenna 14 causes variation in reflection coefficient as a function of scan angle, and such variation in reflection coefficient is not related to condition of the radome 12. Variations of scan angles will be appreciated by reference to the positions of the antenna 18, shown in phantom, within the radomes 112, 212, and 312. Therefore, simply monitoring magnitude of radar returns from the radome 12 presents shortcomings, as discussed above for monitoring condition of the radome 12 when the radome 12 has a varied shape or the antenna 14 is not centered within the radome 12. Instead, according to the invention, magnitude of a radar return from the radome 12 for a particular location on the radome 12 is compared to magnitude of a stored radar return for that particular location on a known good radome. This comparison will be discussed below.

At a block 60, radar return data from the radome 12 is stored in a table. The processed signal received from the block 58 represents a return coefficient from the radome 12 and is entered into a table that is defined to identify particular locations on the radome 12. Specifically, azimuth and elevation angle data are used to identify locations on the radome 12. According to the invention, when the waveform 40 is transmitted by the system 10, azimuth and elevation data that define the scan angle of the host antenna 18 are provided at a block 62. The azimuth and elevation data defining the scan angle of the host antenna 18 is provided by the weather radar system that includes the host antenna 18 and gimbal 20. The azimuth and elevation data are input at block 60 and are used to index a table to identify a location on the radome 12. As the host radar antenna scans, a series of 8 ranges gates is created by the block 56 and stored along side the azimuth and elevation angles from block 60 present when the data was collected. The return data that is entered into the indexed entry location in the table is an amplitude, defined as the signal that is reflected from the location of the radome 12 is identified by the scan angle of the host antenna 18 and, therefore the antenna 14, when the radar signal was transmitted from the antenna 14. The block 60 suitably stores the return amplitudes, indexed according to azimuth and elevation scan angles that define a location on the radome 12, in any known, acceptable manner. For example, the return amplitude data may be stored in a memory device, such as volatile memory like random access memory (RAM).

At a block 64, return amplitude data for an indexed position on the radome 12 is compared against return amplitude data for the indexed position on a known good radome. Return coefficient data from a known good radome is retrieved from a table 66, such as a look-up table, database, or any other acceptable table for storing indexed data. At the block 64, a comparison is made between the measured return amplitude data for the indexed position on the radome with return amplitude data retrieved from the table 66 for the indexed position on a known good radome. When a ratio of measured return amplitude data to the stored return amplitude data retrieved from the table 66 is less than a predetermined factor, then a normal condition of the radome 12 is indicated. As such, no further processing is desirable. The predetermined factor is selected to identify a degraded condition of a radome while minimizing false alarms. As such, the predetermined factor has a minimum value of one and a maximum value as desired for an application. For example, the predetermined factor may have a value of two for indicating degraded condition of the radome 12 when a measured return amplitude exceeds the stored return amplitude by three (3) dB or more. It will be appreciated that predetermined factors greater than or less than two may be selected as desired, such as a range of predetermined factors from one to three, to balance sensitivity of detection of radome degradation with occurrence of false alarms from noise.

When the ratio of the measured return amplitude to the stored return amplitude data retrieved from the table 66 exceeds the predetermined factor, a degraded condition of the radome 12 is indicated. When a degraded condition of the radome 12 is indicated, an alert is provided to a radar operator via the host-radar signal processor on the radar display.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A system for in-place measurement of reflectivity of a radome of an airplane, the system comprising:
   a radar drive circuit that is arranged to generate radar signals having a predetermined frequency;
   an antenna that is arranged to receive the generated radar signals from the radar drive circuitry and to transmit radar waves at the predetermined frequency, the antenna being arranged to receive radar return waves from the radome, the antenna being in far field relation to the radome at the predetermined frequency, the antenna being mountable on a scanning apparatus that is arranged to scan a substantial area of the radome;
   a radar receiver arranged to receive from the antenna the radar return waves from the radome and generate radar return signals; and
   a signal processor arranged to process the radar return signals from the radar receiver, the signal processor being arranged to determine when magnitude of a radar return signal for a scanned area of the radome exceeds a predetermined level, wherein magnitude of the radar return signal in excess of the predetermined level is indicative of a degraded condition of the radome.

2. The system of claim 1, wherein the scanning apparatus includes a host antenna of a host radar system.

3. The system of claim 2, wherein the host antenna includes rows of slotted radiating elements, the antenna being arranged to be mounted between the rows of the slotted radiating elements.

4. The system of claim 2, wherein the host antenna is arranged to scan in azimuth and elevation.

5. The system of claim 2, wherein the host radar system is a weather radar system.

6. The system of claim 1, wherein the antenna includes an array of a plurality of radiating elements.

7. The system of claim 6, wherein the antenna includes a printed circuit patch antenna.

8. The system of claim 1, wherein the radar signals include frequency modulation continuous wave waveforms.

9. The system of claim 2, wherein the predetermined frequency includes multiples of an operating frequency of the host radar system.

10. The system of claim 1, wherein the predetermined frequency is in the millimeter-wave frequency range.

11. The system of claim 10, wherein the predetermined frequency is substantially 30 gigahertz.

12. The system of claim 1, further comprising means for beating frequency of the radar return signals against frequency of the generated radar signals.

13. The system of claim 12, wherein the frequency beating means includes a mixer.

14. The system of claim 12, further comprising means for determining range from the antenna to the radome.

15. The system of claim 14, wherein range determining means performes a Fast Fourier Transform.

16. The system of claim 1, further comprising means for comparing magnitude of the processed radar return signals for a location on the radome as determined by azimuth and elevation angles with a stored value of magnitude of processed radar return signals for the location on a known good radome.

17. The system of claim 16, wherein the magnitude of the radar return signals for the scanned area of the radome exceeds the predetermined level when a ratio of magnitude of the processed radar return signals for the location on the radome to the stored value of the magnitude of the processed radar return signals for the location on the radome exceeds a predetermined value.

18. The system of claim 17, wherein the predetermined value is substantially between 1 and 2.

19. The system of claim 1, further comprising means for providing an alert signal when the magnitude of the radar return signals exceeds the predetermined level.

20. A method for measuring reflectivity of a radome of an airplane, the method comprising:
   generating radar signals having a predetermined frequency;
   transmitting from an antenna radar waves at the predetermined frequency;

receiving radar return waves from the radome;

generating radar return signals from the radar return waves;

comparing magnitude of the radar return signals for a location on the radome with a stored value of magnitude of radar return signals for the location on a known good radome; and indicating that the location on the radome is in a degraded condition when a ratio of magnitude of the radar return signals for the location on the radome to the stored value of the magnitude of the radar return signals for the location on a known good radome exceeds a predetermined value.

21. The method of claim 20, wherein the predetermined value is substantially between 1 and 2.

22. The method of claim 20, further comprising beating frequency of the radar return signals against frequency of the generated radar signals.

23. The method of claim 22, further comprising determining range from the antenna to the radome.

24. A system for in-place measurement of reflectivity of a radome of an airplane, the system comprising:

a radar drive circuit that is arranged to generate radar signals having a predetermined frequency;

an antenna that is arranged to receive the generated radar signals from the radar drive circuitry and to transmit radar waves at the predetermined frequency, the antenna being mountable on scanning apparatus that is arranged to scan a substantial area of the radome;

a radar receiver arranged to receive from the antenna the return radar waves from the radome and generate radar return signals; and a signal processor arranged to process the radar return signals from the radar receiver, the signal processor including:

means for beating frequency of the radar return signals against frequency of the generated radar signals;

means for determining range from the antenna to the radome; and means for comparing magnitude of the processed radar return signals for a location on the radome as determined by azimuth and elevation angles with a stored value of magnitude of processed radar return signals for the location on a known good radome, wherein a degraded condition of the radome is indicated when a ratio of the magnitude of the processed radar return signals for the location on the radome to the stored value of the magnitude of the processed radar return signals for the location on the radome exceeds a predetermined value.

25. The system of claim 24, wherein the predetermined value is substantially between 1 and 2.

26. The system of claim 24, wherein the scanning apparatus includes a host antenna of a host radar system.

27. The system of claim 26, wherein the host antenna includes rows of slotted radiating elements, the antenna being arranged to be mounted between the rows of the slotted radiating elements.

28. The system of claim 26, wherein the host radar system is a weather radar system.

29. The system of claim 24, wherein the antenna includes an array of a plurality of radiating elements.

30. The system of claim 29, wherein the antenna includes a printed circuit patch antenna.

31. The system of claim 24, wherein the radar signals include frequency modulation continuous wave waveforms.

32. The system of claim 26, wherein the predetermined frequency includes multiples of an operating frequency of the host radar system.

33. The system of claim 24, wherein the predetermined frequency is in the millimeter-wave frequency range.

34. The system of claim 33, wherein the predetermined frequency is substantially 30 gigahertz.

35. The system of claim 24, wherein the frequency beating means includes a mixer.

36. The system of claim 24, wherein the range determining means performs a Fast Fourier Transform.

37. The system of claim 24, further comprising means for providing an alert signal when the degraded condition of the radome is indicated.

38. A system for in-place measurement of reflectivity of a radome of an airplane, the system comprising:

a radar drive circuit that is arranged to generate radar signals having a predetermined frequency;

an antenna that is arranged to receive the generated radar signals from the radar drive circuitry and to transmit radar waves at the predetermined frequency, the antenna being arranged to receive radar return waves from the radome, the antenna being mountable on a scanning apparatus that is arranged to scan a substantial area of the radome;

a radar receiver arranged to receive from the antenna the radar return waves from the radome and generate radar return signals; and a signal processor arranged to process the radar return signals from the radar receiver, the signal processor including:

a first component configured to compare magnitude of the radar return signals for a location on the radome with a stored value of magnitude of radar return signals for the location on a known good radome; and a second component configured to indicate that the location on the radome is in a degraded condition when a ratio of magnitude of the radar return signals for the location on the radome to the stored value of the magnitude of the radar return signals for the location on a known good radome exceeds a predetermined value.

39. The system of claim 38, wherein the scanning apparatus includes a host antenna of a host radar system.

40. The system of claim 39, wherein the host antenna includes rows of slotted radiating elements, the antenna being arranged to be mounted between the rows of the slotted radiating elements.

41. The system of claim 39, wherein the host antenna is arranged to scan in azimuth and elevation.

42. The system of claim 39, wherein the host radar system is a weather radar system.

43. The system of claim 38, wherein the antenna includes an array of a plurality of radiating elements.

44. The system of claim 38, wherein the antenna includes a printed circuit patch antenna.

45. The system of claim 38, wherein the radar signals include frequency modulation continuous wave waveforms.

46. The system of claim 39, wherein the predetermined frequency includes multiples of an operating frequency of the host radar system.

47. The system of claim 38, wherein the predetermined frequency is in the millimeter-wave frequency range.

48. The system of claim 47, wherein the predetermined frequency is substantially 30 gigahertz.

49. The system of claim 38, further comprising means for beating frequency of the radar return signals against frequency of the generated radar signals.

50. The system of claim 49, wherein the frequency beating means includes a mixer.

51. The system of claim 49, further comprising means for determining range from the antenna to the radome.

52. The system of claim 51, wherein the range determining means performs a Fast Fourier Transform.

53. The system of claim 38, wherein the location on the radome is determined by azimuth and elevation angles.

54. The system of claim 53, wherein the predetermined value is substantially between 1 and 2.

55. The system of claim 38, further comprising means for providing an alert signal when the magnitude of the radar return signals exceeds the predetermined level, the system comprising:

a first radar antenna, including an array of a plurality of first radar antenna elements;

a radar drive circuit that is arranged to generate radar signals having a predetermined frequency;

a second radar antenna that is arranged to receive the generated radar signals from the radar drive circuitry and to transmit radar waves at the predetermined frequency, the antenna being arranged to receive radar return waves from a radome, the antenna being mountable between two of the plurality of first radar array elements;

a radar receiver arranged to receive from the second radar antenna the radar return waves from the radome and generate radar return signals; and a signal processor arranged to process the radar return signals from the radar receiver, the signal processor being arranged to determine a magnitude of a radar return signal.

56. The system of claim 55, wherein the signal processor compares the magnitude of the radar return signals to the magnitude of the radar signals.

57. The system of claim 55, wherein the signal processor generates a ratio of the magnitude of the radar signals to the magnitude of the radar return signals.

58. The system of claim 57, wherein the ratio is indicative of a health state of the radome at a point where the radar return signals reflect from the radome.

59. The system of claim 58, wherein the first radar antenna is mounted on a mount, the mount is configured to direct the first radar antenna elements to receive reflected first radar return signals reflected along a plurality of radials, each radial being determined by an azimuth and an elevation.

60. The system of claim 59, wherein directing the mount simultaneously moves the second radar antenna to the radial determined by the azimuth and the elevation.

61. The system of claim 60, wherein the ratio is determined for each radial according to the azimuth and the elevation.

62. The system of claim 61, wherein the first radar antenna is used to receive the first radar return signals from the first radar antenna, the first radar return signals being associated with the azimuth and the elevation, the first radar return signals being processed according to the ratio.

63. The system of claim 62, wherein processing the first radar return signals includes deleting the first radar return signals where the ratio exceeds a predetermined value.

* * * * *